(12) United States Patent
Walker

(10) Patent No.: US 9,750,187 B2
(45) Date of Patent: Sep. 5, 2017

(54) ADJUSTABLE ROW UNIT DECK PLATE FOR A HEADER OF AN AGRICULTURAL HARVESTER

(71) Applicant: CNH Industrial America LLC, New Holland, PA (US)

(72) Inventor: Eric L. Walker, Leola, PA (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 0 days.

(21) Appl. No.: 14/578,901

(22) Filed: Dec. 22, 2014

(65) Prior Publication Data
US 2016/0174462 A1    Jun. 23, 2016

(51) Int. Cl.
A01D 45/02    (2006.01)

(52) U.S. Cl.
CPC .......... *A01D 45/023* (2013.01); *A01D 45/021* (2013.01)

(58) Field of Classification Search
CPC .. A01D 45/021; A01D 45/023; A01D 45/025; A01D 43/082; A01D 57/22; A01D 45/02
USPC .......................... 56/62, 119, 106, 103; 460/29
See application file for complete search history.

(56) References Cited

U.S. PATENT DOCUMENTS

| | | | | |
|---|---|---|---|---|
| 2,949,716 A | * | 8/1960 | Thomson | A01D 45/021 56/14.3 |
| 3,101,579 A | * | 8/1963 | Karlsson | A01D 45/021 56/105 |
| 3,126,690 A | * | 3/1964 | Keller et al. | A01D 45/025 56/107 |
| 3,262,255 A | * | 7/1966 | Karlsson | A01D 45/025 56/107 |
| 3,271,940 A | * | 9/1966 | Ashton | A01D 41/141 56/105 |
| 3,589,110 A | * | 6/1971 | Schreiner | A01D 41/142 56/106 |
| RE27,554 E | * | 1/1973 | Ashton et al. | A01D 45/021 56/105 |
| 3,759,021 A | * | 9/1973 | Schreiner | A01D 69/06 56/106 |
| 5,060,464 A | | 10/1991 | Caron | |

(Continued)

FOREIGN PATENT DOCUMENTS

| | | |
|---|---|---|
| EP | 1133911 A1 | 9/2001 |
| FR | 1509507 A | 1/1968 |

OTHER PUBLICATIONS

PCT/US2015/067348, International Search Report and Written Opinion, dated Apr. 5, 2016, 12 pages.

*Primary Examiner* — Arpád Fábián Kovács
(74) *Attorney, Agent, or Firm* — Peter K. Zacharias; Patrick M. Sheldrake

(57) ABSTRACT

An adjustable row unit for a header of an agricultural harvester, the adjustable row unit including a movable deck plate. The movable deck plate is connected to a row unit frame extending in a fore and aft direction of the header. A pivot shaft extends in the fore and aft direction and is pivotably connected to the row unit frame and the deck plate. A rocker assembly connects the deck plate to the pivot shaft for enabling selective positioning of the deck plate relative to the row unit frame in a direction substantially transverse to the fore and aft direction and whereby parallelism between the deck plate and an opposing deck plate is maintained throughout the crop harvesting process.

20 Claims, 7 Drawing Sheets

(56) References Cited

U.S. PATENT DOCUMENTS

| | | | |
|---|---|---|---|
| 5,680,750 A * | 10/1997 | Stefl | A01D 45/021 56/119 |
| 5,878,559 A * | 3/1999 | Cooksey | A01D 45/023 56/104 |
| 5,878,561 A * | 3/1999 | Gunn | A01D 45/023 56/119 |
| 6,226,969 B1 | 5/2001 | Becker | |
| 6,237,312 B1 * | 5/2001 | Becker | A01D 45/021 56/119 |
| 7,874,134 B1 * | 1/2011 | Hoffman | A01D 45/023 56/119 |
| 7,913,480 B2 * | 3/2011 | Christensen | A01D 45/021 56/119 |
| 8,181,434 B2 | 5/2012 | Rottinghaus | |
| 8,196,380 B2 | 6/2012 | Carboni | |
| 8,220,235 B2 | 7/2012 | Kowalchuk | |
| 8,224,534 B2 * | 7/2012 | Kowalchuk | A01D 45/021 460/29 |
| 8,402,727 B2 | 3/2013 | Carboni | |
| 8,820,039 B2 * | 9/2014 | Werning | A01D 45/021 460/5 |
| 8,863,487 B2 * | 10/2014 | Calmer | A01D 45/021 56/106 |
| 9,179,602 B2 * | 11/2015 | Vandeven | A01D 45/021 |
| 2008/0092507 A1 * | 4/2008 | Bollig | A01D 45/021 56/106 |
| 2011/0011048 A1 * | 1/2011 | Hoffman | A01D 45/023 56/119 |
| 2011/0146217 A1 * | 6/2011 | Carboni | A01D 45/021 56/60 |
| 2011/0146218 A1 * | 6/2011 | Carboni | A01D 45/021 56/62 |
| 2011/0173942 A1 * | 7/2011 | Kowalchuk | A01D 45/021 56/62 |
| 2012/0029757 A1 * | 2/2012 | Kowalchuk | A01D 45/021 701/34.2 |
| 2014/0053524 A1 * | 2/2014 | Werning | A01D 45/021 56/62 |
| 2014/0150394 A1 | 6/2014 | Calmer | |
| 2014/0331633 A1 * | 11/2014 | Vandeven | A01D 45/021 56/62 |

* cited by examiner

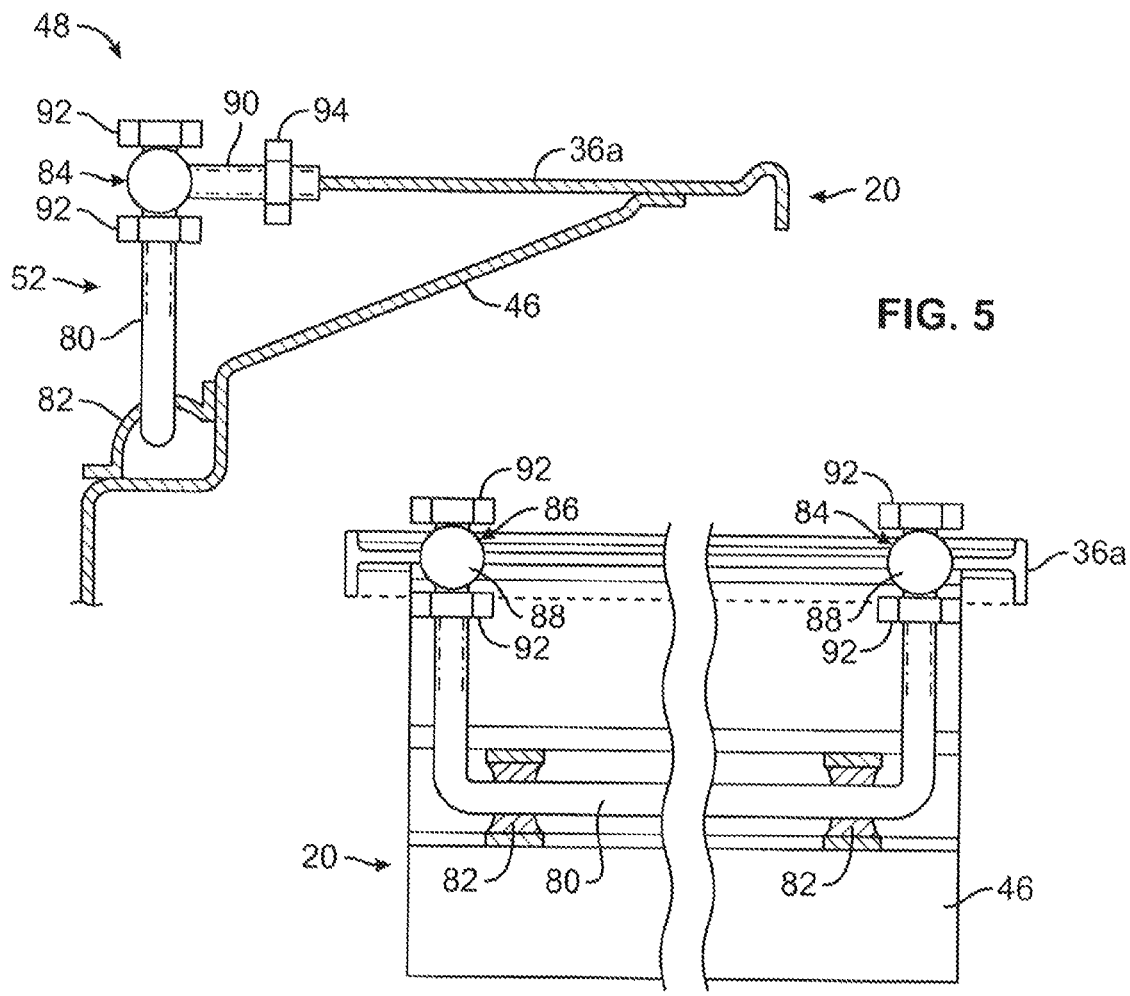
FIG. 5
FIG. 6
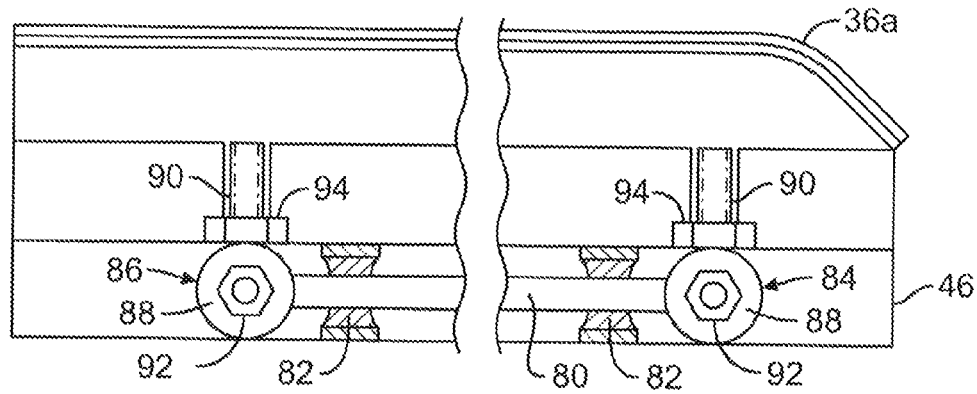
FIG. 7

ADJUSTABLE ROW UNIT DECK PLATE FOR A HEADER OF AN AGRICULTURAL HARVESTER

BACKGROUND

The subject application relates generally to a header for use with agricultural harvesters. In particular, the subject application relates to an adjustable row unit deck plate for an agricultural harvester header.

The header of an agricultural harvester or combine is provided with row dividers and associated hoods for directing rows of corn stalks to downstream separation devices known as row units. The row units include stalk receiving slots or gaps and stripping plates, snapping rolls, and opposed rearwardly moving gathering chains. Thus, e.g., following separation of ears from stalks by the snapping rolls and stripping plates (also known as stalk rolls and deck plates, respectively), the separated ears are delivered by the gathering chains to an auger or other suitable conveyor which conveys the harvested ears to a feederhouse of the combine. Harvested ears are then processed to the combine's inner chambers for downstream processing.

Row unit frames are typically constructed with forwardly projecting members that support several components of the row unit including the deck plates, the stalk roll support bearings, the front gathering chain idlers, the hood and the row divider. As is known, the stalk rolls are disposed beneath the deck plates and are cooperatively rotated to pull the corn stalks downwardly into the stalk receiving slots where the ears come into contact with the deck plates and are snapped off of the stalks by the deck plates. The lateral spacing between deck plates is often achieved by a control linkage which connects at least one movable deck plate to an extensible actuator such as a hydraulic cylinder or the like. Extension and retraction of the actuator moves one or both of the deck plates in a direction transverse to the direction of travel of the header, e.g., a medial or lateral direction of the header, in order to adjust the gap or spacing between the deck plates to accommodate the crop being harvested.

A disadvantage of presently available headers is that individual deck plates do not maintain their parallelism as crop is being harvested. Despite the presence of the control linkage(s), individual deck plates often misalign with respect to the row unit during operation whereby either the fore or aft portions of the deck plate converge or diverge out of a substantially parallel alignment with an opposing deck plate. Under such circumstances, if the fore regions of the deck plates converge too severely, then the leading edges of the deck plates will prevent a portion of the crop from being harvested. Conversely, if the fore regions of the deck plates diverge too severely, then they may prevent certain ears of crop from being stripped from the stalk by the deck plates, whereby crop is left on the stalk as it is pulled under by the stalk rolls, thereby also reducing crop yield. Furthermore, if the fore regions of the deck plates are too divergent, then the aft end of the crop receiving gap will clog with stalk debris which requires periodic stoppage of the harvesting operation in order to remove the crop matter from between the deck plates.

Moreover, parallelism between deck plates is not always maintained when the control linkage is extended and retracted. That is, when the control linkage is retracted the deck plates may stray from essentially parallel relationship whereby the leading or fore edges of the deck plates often tend to converge or come together in a "toe-in" or snowplow arrangement. In such a position, the leading edges of the deck plates will prevent a portion of the crop from being harvested.

Further, when the control linkage is extended the deck plates may also stray from essentially parallel relationship in the opposite direction whereby the leading or fore edges of the deck plates tend to diverge or spread apart in a "toe-out" configuration. In such a position, the leading edges of the deck plates will prevent a portion of the crop from being harvested.

BRIEF SUMMARY

In accordance with a first aspect, the subject application provides a row unit for a header of an agricultural harvester comprising a row unit frame extending in a fore and aft direction of the header, a first deck plate carried by the row unit frame, and an adjusting mechanism. The adjusting mechanism includes an adjusting arrangement for moving the first deck plate in a direction substantially transverse to the fore and aft direction, and a rocker assembly establishing a position of the first deck plate independently of the adjusting arrangement. The rocker assembly includes an adjustable connection for adjusting a position of the first deck plate independently of the adjusting arrangement e.g., relative to a first pivot shaft of the rocker assembly that is pivotably connected to the row unit frame and the first deck plate, or the row unit frame.

In accordance with a second aspect, the subject application provides a row unit for a header of an agricultural harvester comprising first and second longitudinally extending stripping plates mounted on a frame and having opposed stripping edges which define a gap between them. The row unit further includes a gap adjusting mechanism. The gap adjusting mechanism comprises an adjusting arrangement for moving the first and second stripping plates and a rocker assembly for establishing a position of the first and second stripping plates independently of the adjusting arrangement.

In accordance with a third aspect, the subject application provides a method of positioning a row unit deck plate relative to a row unit frame comprising the acts of connecting an adjusting arrangement to the row unit frame and the deck plate for moving the deck plate, connecting a rocker assembly to the row unit frame and the deck plate for establishing a position of the deck plate independently of the adjusting arrangement, and adjusting the adjusting arrangement and the rocker assembly to adjust the position of the deck plate.

A row unit so constructed and the method for positioning same result in an arrangement whereby the row unit is more conducive to effective stripping of crop from stalk and less prone to clogging with debris than presently known assemblies. The rockshaft (or rocker assembly) adjustment mechanism operates independently of a deck plate gap adjusting arrangement. The rockshaft is supported for pivoting movement and is substantially U-shaped with a central region bounded by a pair of arms or forks. The forks may be mounted low and to the row unit frame and the inverted rockshaft increases the strength of the mechanism without increasing weight. Adjustable connecting shafts are coupled to the forks and are mounted high and connect to the deck plates. The connecting shafts permit adjustment of the position of the deck plate in a direction transverse to the fore and aft direction of the row unit crop receiving slot or gap and adjust the width and shape of the gap as may be desired or necessary for a particular crop being harvested.

The rockshaft assembly also controls the timing of the automatic deck plates and reduces debris build-up on the row unit thus allowing for easier cleaning. The rockshaft keeps the front and rear of the deck plate in line and moving the same amount, and is independent of the adjusting mechanism and auto adjusting mechanism thus allowing for maximum freedom for the deck plate. As such, the deck plate stays clean, is free to move and will not bind. The rocker assembly construction is simple, inexpensive to build and very reliable. Alternative embodiments can include the rockshaft with the shaft at the bottom and at the top of the row unit frame. The result is a rockshaft that acts independently of the actuation mechanism and which controls the front and rear of the deck plate while allowing vertical and horizontal movement.

Moreover, compared to conventional row units, the current slide mechanism of such conventional row units is removed and a rock shaft in accordance with the aspects of the subject application is installed. Further, the rock shaft of the subject application is not controlled by the adjustment mechanism, but instead the rock shaft controls the movement and positioning of the deck plates independent of the adjustment mechanism.

BRIEF DESCRIPTION OF THE SEVERAL VIEWS OF THE DRAWINGS

The foregoing summary, as well as the following detailed description of several aspects of the subject application, will be better understood when read in conjunction with the appended drawings. For the purpose of illustrating the subject application there are shown in the drawings several aspects, but it should be understood that the subject application is not limited to the precise arrangements and instrumentalities shown.

In the drawings:

FIG. 5 is an enlarged partial end view of a rocker assembly of a row unit according to an aspect of the subject application;

FIG. 6 is a partial side elevation view of the rocker assembly of FIG. 5;

FIG. 7 is a partial top plan view of the rocker assembly of FIG. 5;

DETAILED DESCRIPTION

Reference will now be made in detail to the various aspects of the subject application illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, left, right, above, below and diagonal, are used with respect to the accompanying drawings. Such directional terms used in conjunction with the following description of the drawings should not be construed to limit the scope of the subject application in any manner not explicitly set forth. Additionally, the term "a," as used in the specification, means "at least one." The terminology includes the words above specifically mentioned, derivatives thereof, and words of similar import.

Figure 1:
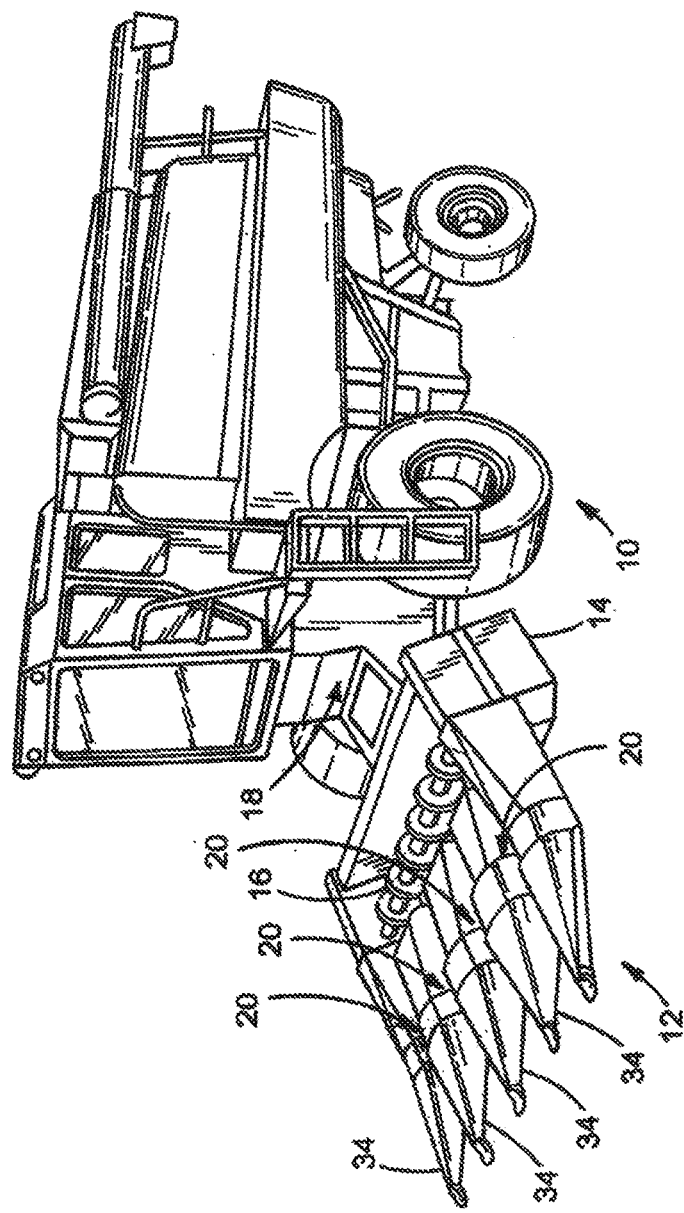
FIG. 1 is a perspective view of an agricultural combine including a corn header assembly in accordance with the subject application.

Referring now to the drawings, wherein aspects of the subject application are shown, FIG. 1 illustrates an agricultural harvester such as a combine 10 including a corn header assembly or corn header 12 having a row unit 20 in accordance with the subject application. The corn header 12 is shown to be operatively connected to the agricultural harvester 10 for harvesting e.g., corn and feeding the corn to a feederhouse for receiving crop residue, cutting, chopping and propelling the residue rearwardly and outwardly from the agricultural harvester 10 while retaining the valuable corn ears and kernels. Such feederhouses and harvesting operations are known in the art and a further detailed description of their structure, function and operation is not necessary for a complete understanding of the present invention. Alternatively, the corn header 12 can be connected to any device that may have use for a corn header.

Figure 2:
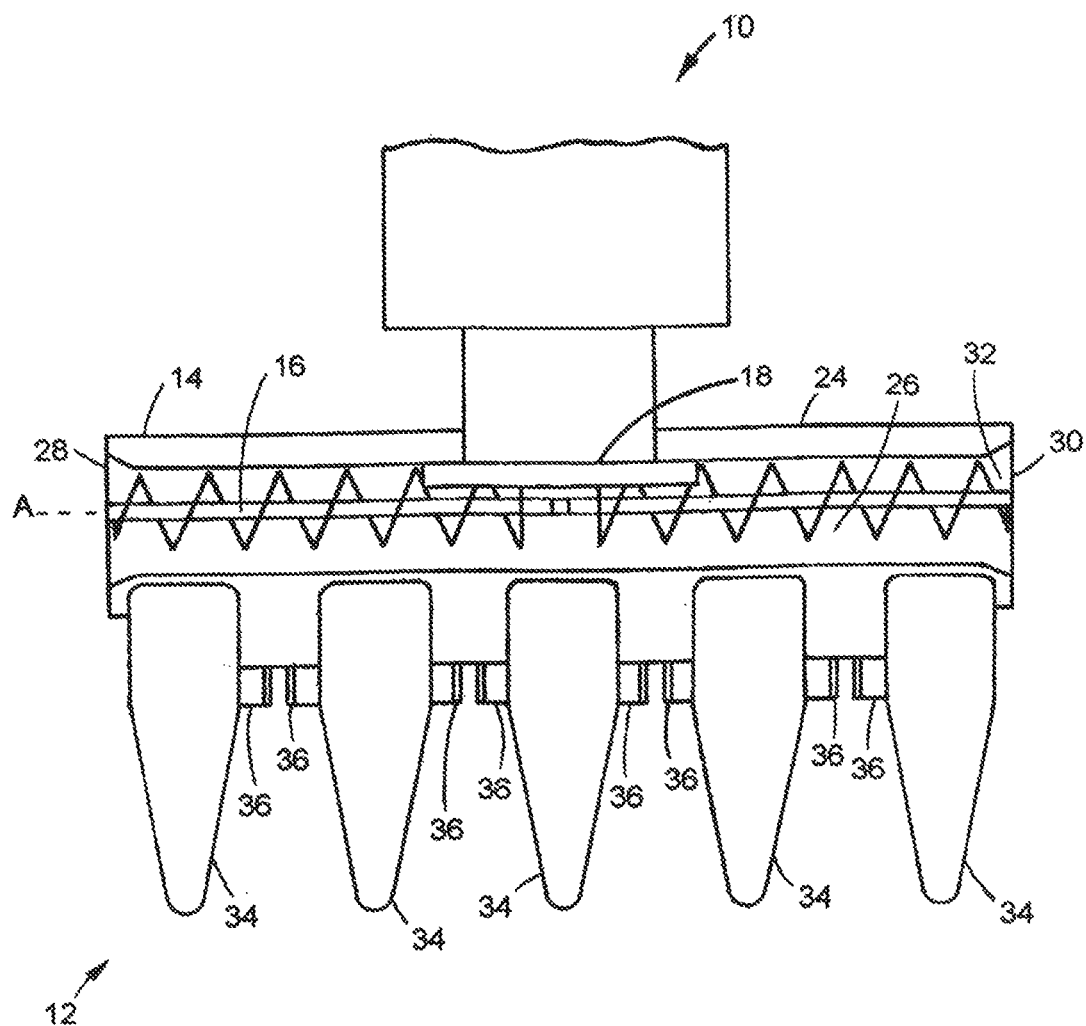
FIG. 2 is a top plan view of the corn header assembly of FIG. 1.

Referring to FIGS. 1 and 2, the corn header 12 includes a frame 14 for mounting to a forward end of the agricultural harvester 10, a conveyor 16 (such as an auger) extending lengthwise across the frame 14 for conveying crop material to a combine feeding location or feederhouse 18, and a plurality of row units 20 extending forwardly from the frame 14. The frame 14 is preferably configured as a substantially rectangular frame, as shown. However, the frame 14 can be configured as any shape suitable for the foregoing intended use. As seen in FIG. 2, the frame 14 includes a rear wall 24, a bottom wall 26 and a pair of side walls 28, 30. The frame 14 further includes a channel 32 formed partially by the bottom wall 26. The conveyor 16 conveys harvested corn along the channel 32 to the combine feeding location 18 located adjacent a midpoint of the channel 32.

The conveyor 16 can be a screw auger conveyor, but can alternatively be any conveyor capable of moving grain through the channel 32, such as a paddle system, a conveyor belt, a pressure based system, or any combination thereof. Such conveyors are known in the art and a further detailed description of their structure, function and operation is not necessary for a complete understanding of the present invention.

The auger 16 is connected to the frame 14 at the side walls 28, 30 and rotates about axis A. The half of the auger 16 that is closest to side wall 28 moves the harvested crop towards the opposite side wall 30 and the half of the auger 16 that is closest to side wall 30 moves the harvested crop towards the opposite side wall 28. The auger 16 is positioned in front or above the combine feeding location 18 and, as the auger 16 rotates, harvested grain moves towards the center of the auger 16 for feeding the harvested grain into the combine feeding location 18.

Figure 3:
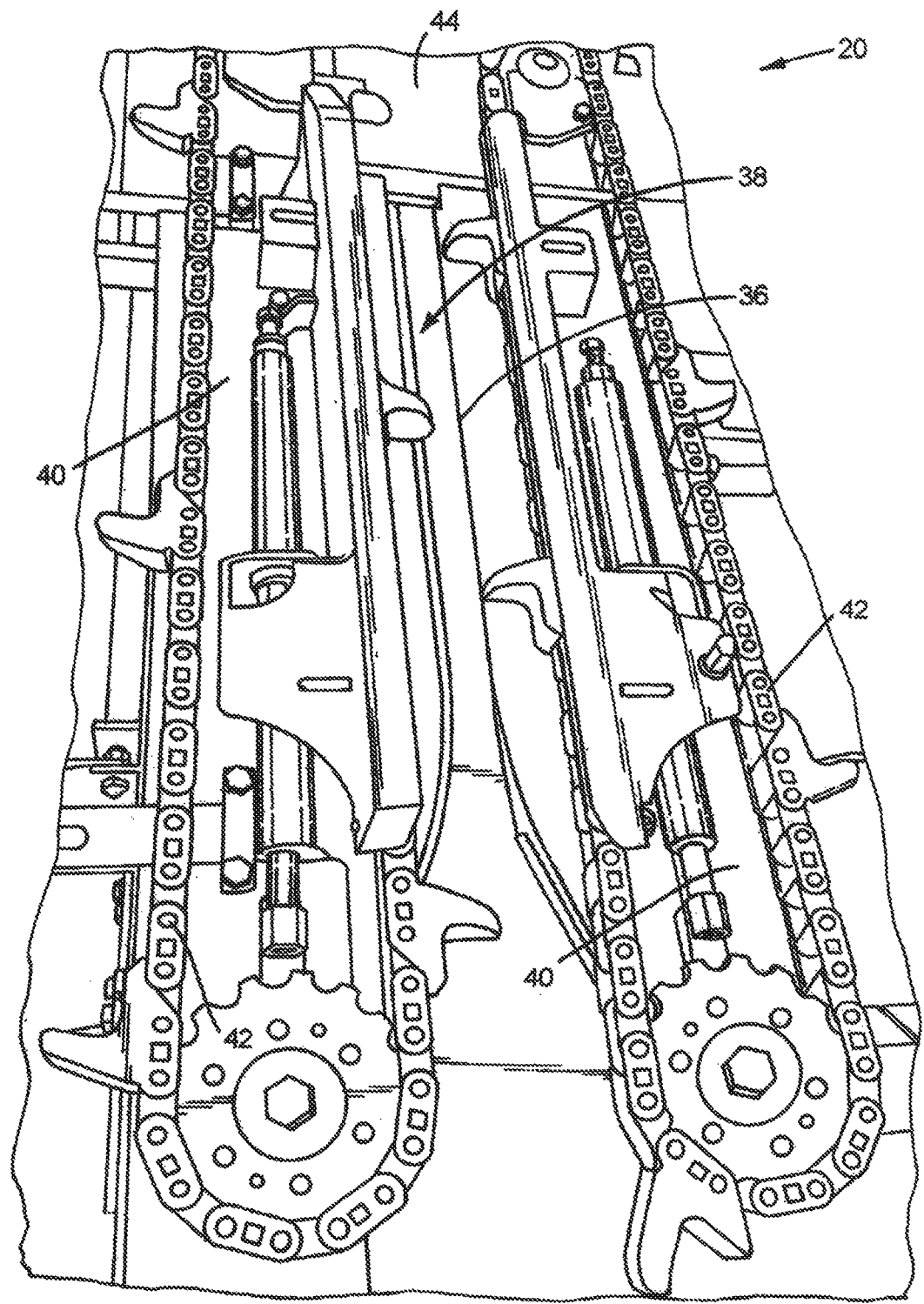
FIG. 3 is an enlarged partial perspective view of a row unit of the corn header assembly of FIG. 1.

Referring still to FIGS. 1 and 2, the corn header 10 further includes a plurality of row dividers 34. The row dividers 34 extend forwardly from the frame 14 and are connected to extend across a pair of adjacent row units 20 (FIG. 1). Such dividers 34 are known in the art and a further detailed description of their structure, function and operation is not necessary for a complete understanding of the present invention. The dividers 34 extend forwardly from the frame 14 and are connected to the plurality of row units 20 for directing a row of corn stalks towards stripping plates 36 (also commonly known as deck plates) of the row units. That is, during harvesting operations, the row dividers 34 direct a row of corn stalk towards deck plates 36 and snapping rolls (also commonly known as stalk stripping rolls, not illustrated) situated between and beneath adjacent row dividers. As seen in FIG. 3, the deck plates 36 define a slot or gap 38 for receiving corn stalks and, as is known, the stalk stripping rolls pull the stalk downwardly snapping the corn ear when it strikes the deck plates. The stalk stripping rolls desirably pull most of the crop residue down and out of the header.

As most clearly seen in FIG. 3, mounted lengthwise on each row unit arm 40 is a gathering chain 42 that directs corn stalks to the rear of the row unit 20 for the removal of corn ears from the stalks by the deck plates 36. In operation, crop material is stripped from the stalk and then travels across a breast plate 44 to the channel 32. The crop material stripped from the stalk is propelled rearwardly to the channel 32 due to the continuous flow of harvested crop material flowing rearwardly as a result of actions of the gathering chains 42.

As described in greater detail below and shown in FIGS. 5-7 and 8A-8C, the row unit 20 includes a row unit frame 46, a first deck plate 36a, and an adjusting mechanism 48 comprising an adjusting arrangement 50 and a rocker assembly 52. The row unit frame 46 (FIGS. 5-7) extends in a fore and aft direction of the header and carries the first deck plate 36a. Deck plates are also commonly referred to as stripping plates and used interchangeably herein. The first deck plate in combination with the second deck plate 36b define a gap between them. Specifically each of the first and second deck plates are longitudinally extending plates having opposed stripping edges which define a gap 38 between them. According to the subject application, it will also be understood that only one of the deck plates 36a, 36b may be constructed and arranged for transverse movement relative to the fore and aft direction of the header or longitudinal axis of the row unit. That is, one of the deck plates 36a, 36b may be affixed to the row unit frame while the other of the deck plates is free to move transversely toward and away from the fixed deck plate.

The adjusting arrangement 50 moves the first deck plate 36a in a direction substantially transverse to the fore and aft direction of the header, and the rocker assembly 52 establishes and controls a position of the first deck plate independently of the adjusting arrangement in a direction substantially transverse to the fore and aft direction of the header.

The adjusting arrangement 50 controls the motion and adjusts the size of the gap spacing between the deck plates 36a, 36b by moving the deck plates toward and away from one another during operation of the corn header. For example, the corn header 10 may be equipped with an extensible and retractable actuator 54 such as a hydraulic cylinder, pneumatic cylinder or a mechanical or electromechanical screw jack or the like that is operated by user input, typically from the harvester cab, for controlling lateral or transverse positioning of at least one of the deck plates 36a, 36b.

Figure 4A:
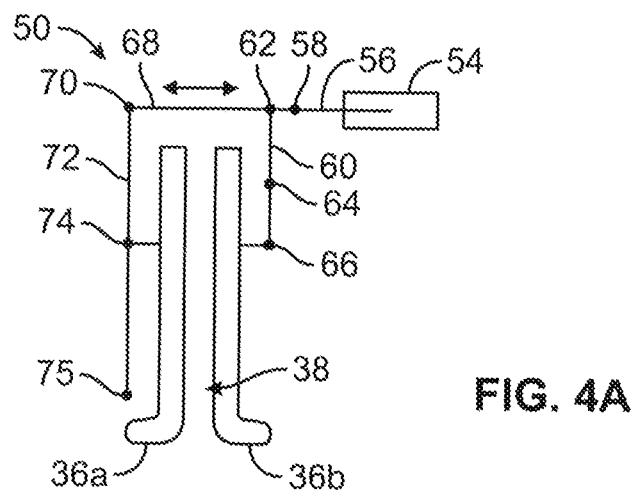
FIGS. 4A-4C are schematic plan views of a deck plate gap adjusting arrangement with certain elements omitted for clarity of illustration of the corn header assembly of FIG. 1.
Figure 4B:
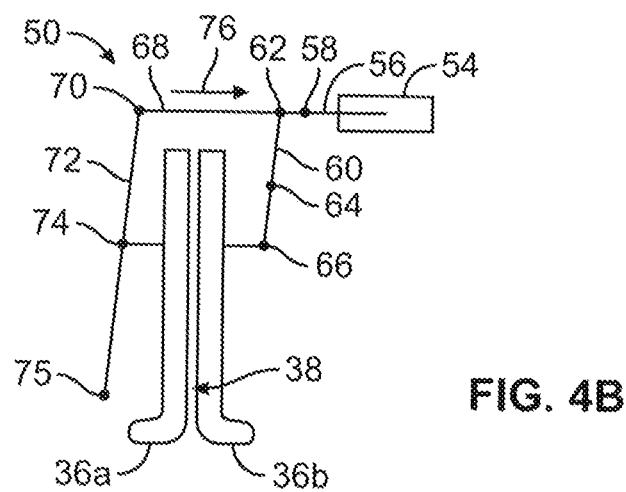
Figure 4C:
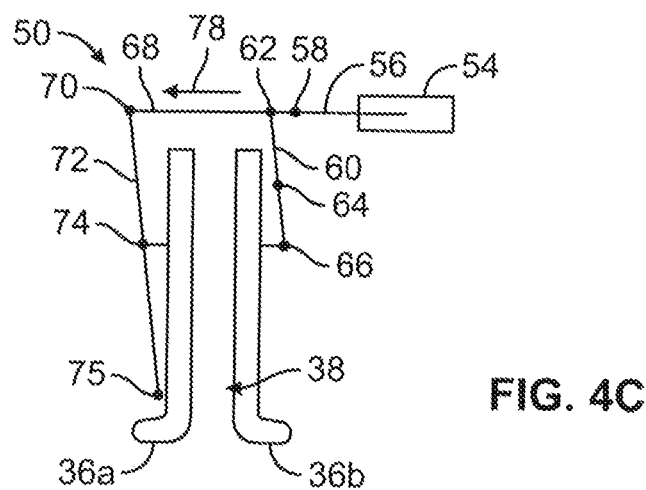

As seen in FIGS. 4A-4C, in the present aspect the adjusting arrangement 50 is configured to move both the deck plates 36a, 36b to provide lateral movement toward and away from one another by pivotable connections which link the deck plates 36a, 36b to the extensible and retractable actuator 54.

The deck plates 36a, 36b are connected to actuator 54 e.g., via an array of links and pivotable connections. For example, the adjusting arrangement can be configured to include a first link 56 that extends from actuator 54 to a first pivot 58. Beyond pivot 58 is a first fore and aft directed link 60 which is pivotably connected to link 56 at pivot 62. Intermediate the length of link 60 is an intermediate pivot 64 pivotably connected to row unit frame 46 and at the opposite end of link 60 is an end pivot 66 which is pivotably connected to deck plate 36b.

Following pivot 62 in the longitudinal direction of deck plate 36b, first link 56 is connected to another link 68 that terminates at another pivot 70 which pivotably connects to a second fore and aft directed link 72. Link 72 extends from pivot 70 to an intermediate pivot 74 which is pivotably connected to deck plate 36a and to an end pivot 75 pivotably connected to row unit frame 46. It will be appreciated, therefore, that actuation of the actuator 54 in a first direction, e.g., in the direction of arrow 76 of FIG. 4B, results in narrowing of the spacing or gap between the deck plates 36a, 36b. Conversely, actuation of the actuator 54 in an opposite direction, e.g., in the direction of arrow 78 of FIG. 4C, results in widening of the gap between the deck plates 36a, 36b.

Referring to FIGS. 5-7, the row unit frame 46 extends in a fore and aft direction of the header defining a longitudinal axis of the frame. The first deck plate 36a is carried by the row unit frame and the rocker assembly 52. The rocker assembly includes a first pivot shaft 80 extending in the fore and aft direction and pivotably connected to the row unit frame, e.g., via bearings 82 and to the first deck plate via independently adjustable first and second members 84, 86. According to an aspect, the first pivot shaft 80 is pivotable in the bearings from between about 0° and 90°. The pivot shaft 80 comprises a first end and a second end opposite the first end wherein each of the first and second ends are connected to the first deck plate in a spaced relation. That is, each of the first and second pivot shafts of the rocker assembly comprise a first end and a second end opposite the first end wherein the first and second ends of the first pivot shaft are connected to the first stripping plate in a spaced relation, and wherein the first and second ends of the second pivot shaft are connected to the second stripping plate in a spaced relation.

The first pivot shaft 80 is substantially U-shaped (as best shown in FIG. 6) and the first member 84 is connected to one end of the first pivot shaft and the second member 86 is connected to an opposite end of the first pivot shaft 80. According to an aspect the first and second members 84, 86 each include an adjustable ball joint 88 having an adjustable connection 90, e.g., a threaded member, for adjusting the position of the first deck plate 36a relative to the first pivot shaft or the row unit frame. That is, the adjustable connection allows for adjustment of the size of the gap between the first and second stripping plates independent of the adjusting arrangement. According to an aspect, the adjustable connection 90 is constructed as a threaded shaft. The threaded shaft is connected to the ball joint and extends therefrom in a direction towards the deck plate. A moving member 94 which is connected to the deck plate 36a slidingly engages the threaded shaft of the adjustable connection to secure the deck plate at a fixed position along a length of the adjustable connection. That is, the distance which the adjustable connection adjusts the position of the deck plate 36a relative to the rocker shaft 80 and therefore the size of gap 38 is achievable by adjusting the position of the member 94 (which can be e.g., a nut or the like) along the length of the adjustable connection.

While the foregoing adjustable connection is described as a threaded shaft and nut configuration, it can alternatively be configured as any other adjustable connection suitable for the intended purpose, such as a ratcheting mechanism or a pin/slot mechanism. Likewise, the adjustable ball joint can alternatively be configured as any other pivotable connection mechanism suitable for the intended purpose, such as a universal joint and the like.

Figure 9:
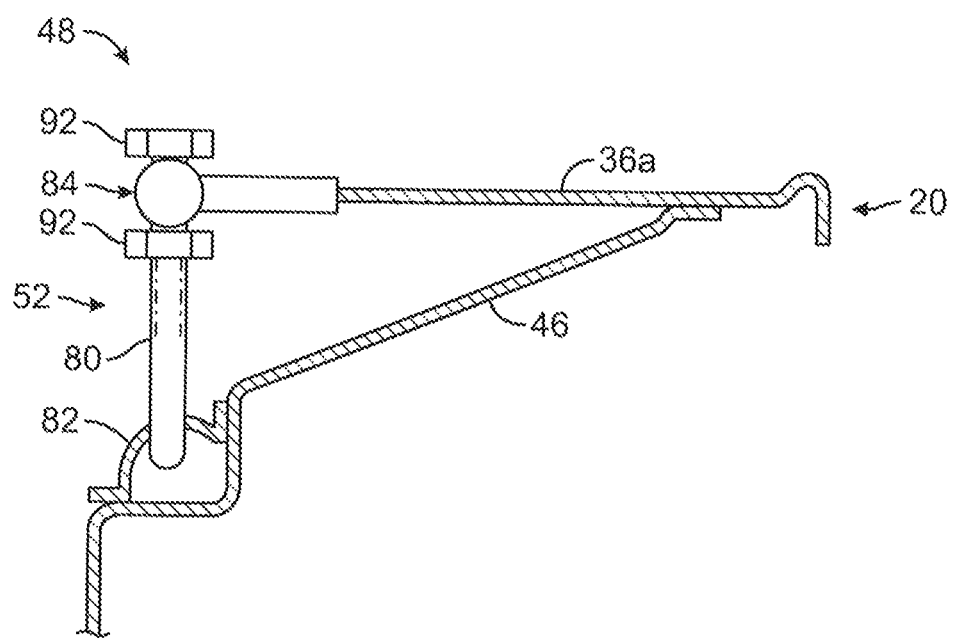
FIG. 9 is an enlarged partial end view of a rocker assembly of a row unit according to another aspect of the subject application.

Alternatively, the rocker assembly can be configured without the adjustable connection such that the rocker assembly is directly connected to the deck plate(s) for controlling the motion of the deck plate(s) as the deck plate(s) is moved by the adjusting arrangement (see FIG. 9). In this configuration, the first and second members are directly connected to the deck plate(s) e.g., via the adjustable ball joint, such that the deck plate(s) are not adjustable with respect to the rocker assembly.

The first pivot shaft 80 includes a central portion bounded by arms or forks which threadedly receive nuts 92 or the like for adjustably maintaining the adjustable ball joint on the first pivot shaft. First and second members 84, 86 are spaced apart from one another in the fore and aft direction and connect to the first deck plate for enabling selective positioning of the first deck plate relative to the row unit frame in a direction substantially transverse to the fore and aft direction of the header.

It will be understood that the opposed deck plate 36b may be affixed in position to its respective row unit frame. However, it may also be adjustably supported by the row unit frame in the manner described herein. That is, the rocker assembly may include a second pivot shaft 80 (see FIGS. 8A-8C) extending in the fore and aft direction and pivotably connected to the row unit frame and the second deck plate 36b. Further, the rocker assembly may include independently adjustable, spaced apart third and fourth members similar to the first and second members 84, 86 for connecting the second deck plate 36b to the second pivot shaft 80 for enabling selective positioning of the second deck plate relative to the row unit frame 46 in a direction substantially transverse to the fore and aft direction of the header.

In other words, the row unit comprises first and second longitudinally extending deck plates or stripping plates 36a, 36b mounted on the row unit frame 46 and having opposed stripping edges which define a gap 38 between them. The gap adjusting mechanism includes a rocker assembly and an adjusting arrangement having e.g., actuator 54 and linkages and pivots similar to those shown in FIGS. 4A-4C for adjusting a size of the gap 38 between the first and second stripping plates. The rocker assembly operatively connected to one or both of the first and second stripping plates is operable to adjust the size of the gap independently of the adjusting arrangement. That is, even when the adjusting arrangement is in a fixed position, the deck plates can be moved to adjust the size of the gap independent of the adjusting arrangement by the adjustable connections.

Figure 8A:
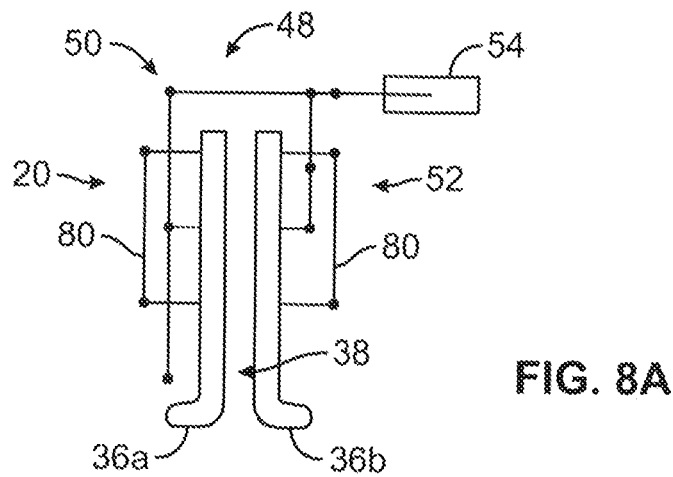
FIGS. 8A-8C are schematic plan views of a deck plate assembly in accordance with an aspect of the subject invention.
Figure 8B:
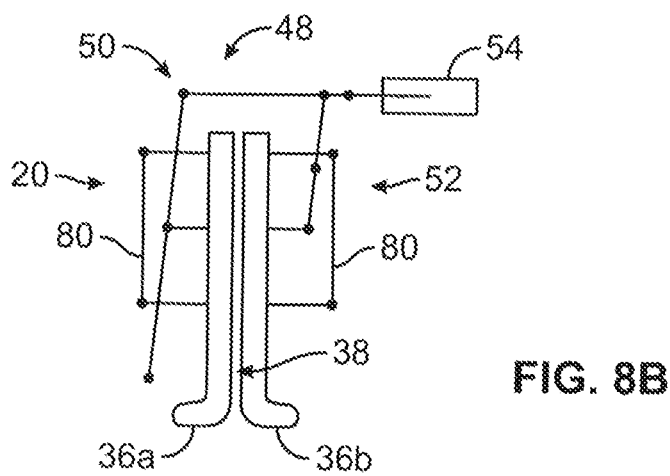
Figure 8C:
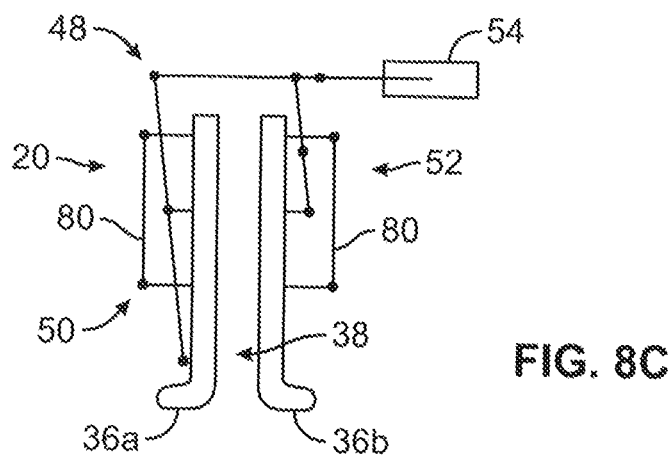

Referring to FIGS. 8A-8C, there is shown in schematic view the row unit 20 at various stages of operation. The array of links and pivots serve to move the deck plates between first and second positions corresponding to relatively wider and narrower gaps. In moving between first and second positions the rocker assembly maintains parallelism between the deck plates as the deck plates widen or narrow. The rocker assembly 52 advantageously independently adjusts the positions of the deck plates in a direction transverse to the fore and aft direction of the header and maintains parallelism with respect to the deck plates during operation. As described above, the rocker assembly includes pivot shaft 80 pivotably attached at spaced apart locations to each of the deck plates 36a, 36b. By being secured to the row unit frame 46 (FIGS. 5-7) the rocker shafts 80 impart stability to the deck plates to prevent them from shifting, converging and/or diverging as the adjusting arrangement is actuated. In so doing, the gap 38 between the deck plates remains essentially parallel throughout a harvesting procedure whereby crop yield is optimized and in-field cleaning episodes are minimized.

In accordance with another aspect, the subject application provides a method of positioning a row unit deck plate relative to a row unit frame which e.g., defines a fore and aft direction, comprising the act of connecting an adjusting arrangement to the row unit frame and the deck plate for moving the deck plate in a direction substantially transverse to the fore and aft direction. The method also includes the act of connecting a rocker assembly to the row unit frame and the deck plate for establishing a position of the deck plate independently of the adjusting arrangement e.g., in a direction substantially transverse to the fore and aft direction, and the act of adjusting the position of the deck plate using the adjusting arrangement and the rocker assembly.

According to an aspect, the rocker assembly comprises a pivot shaft extending adjacent the deck plates, e.g., in the fore and aft direction, and the act of connecting the rocker assembly to the row unit frame and the deck plate includes providing the pivot shaft with an adjustable ball joint pivotably connecting the pivot shaft to the deck plate. The method additionally includes the act of threadedly connecting the ball joint to the deck plate to achieve selective positioning of the deck plate e.g., in a direction substantially transverse to the fore and aft direction.

It will be appreciated by those skilled in the art that changes could be made to the embodiments described above without departing from the broad inventive concept thereof. It is to be understood, therefore, that the subject application is not limited to the particular aspects disclosed, but it is intended to cover modifications within the spirit and scope of the subject application as defined by the appended claims.

I claim:

1. A row unit for a header of an agricultural harvester comprising:
    a row unit frame extending in a fore and aft direction of the header;
    a first deck plate carried by the row unit frame; and
    an adjusting mechanism comprising:
        at least one bearing connected to the row unit frame;
        an adjusting arrangement for moving the first deck plate in a first direction transverse to the fore and aft direction, the first direction being toward or away from an adjacent deck plate, and
        a rocker assembly that moves the first deck plate in a first direction transverse to the fore and aft direction independently of the adjusting arrangement, comprising a first pivot shaft extending in the fore and aft direction, the first pivot shaft comprising a first end connected to the first deck plate at a first location and a second end connected to the first deck plate at a second location, the at least one bearing pivotally mounting the first pivot shaft to the row unit frame to constrain movement of the first location relative to the second location in the first direction.

2. The row unit of claim 1, wherein the first pivot shaft is substantially U-shaped.

3. The row unit of claim 1, wherein the rocker assembly further comprises independently adjustable first and second members, the first member connecting the first deck plate at the first location to the first pivot shaft, the second member connecting the first deck plate at the second location to the first pivot shaft for enabling selective positioning of the first deck plate relative to the row unit frame.

4. The row unit of claim 3, wherein the first and second members are spaced apart from one another in the fore and aft direction.

5. The row unit of claim 4, wherein the first member is pivotally connected to the first end of the first pivot shaft and the second member is pivotally connected to the second end of the first pivot shaft.

6. The row unit of claim 3, wherein the first member comprises a first ball joint connected to the first end of the first pivot shaft, and the second member comprises a second ball joint connected to the second end of the first pivot shaft.

7. The row unit of claim 6, wherein each of the first and second adjustable ball joints includes an adjustable connection for adjusting a position of the first deck plate.

8. The row unit of claim 1, wherein the rocker assembly further comprises an adjustable connection for adjusting a position of the first deck plate independently of the adjusting arrangement.

9. The row unit of claim 1, further comprising a second deck plate carried by the row unit frame opposite the first deck plate, the first and second deck plates defining a crop receiving gap therebetween.

10. The row unit of claim 9, wherein the adjusting mechanism further comprises at least a second bearing, wherein the rocker assembly further comprises a second pivot shaft extending in the fore and aft direction, the second pivot shaft comprising a first end connected to the second deck plate at a third location and a second end connected to the second deck plate at a fourth location, the at least second bearing pivotally mounting the second pivot shaft to the row unit frame to constrain movement of the third location relative to the fourth location in the transverse direction.

11. The row unit of claim 10, wherein the rocker assembly further comprises independently adjustable third and fourth members, the third member connecting the second deck plate at the third location to the second pivot shaft, the fourth member connecting the second deck plate at the fourth location to the second pivot shaft for enabling selective positioning of the second deck plate relative to the row unit frame.

12. The row unit of claim 9, wherein the adjusting mechanism further comprises at least a second bearing, wherein the rocker assembly further comprises a second pivot shaft extending in the fore and aft direction, the second pivot shaft comprising a first end connected to the second deck plate at a third location and a second end connected to the second deck plate at a fourth location, the at least second bearing pivotally mounting the second pivot shaft to the row unit frame to constrain movement of the first deck plate to be toward and away from the second deck plate.

13. The row unit of claim 9, wherein the second deck plate is fixed to the row unit frame.

14. The row unit of claim 1, wherein the first pivot shaft pivots about an axis positioned below the first deck plate and extends in a fore and aft direction of the header, and wherein the adjusting arrangement further comprises a pivotable link driven by an actuator to move the first deck plate in the first direction.

15. A row unit for a header of an agricultural harvester comprising:

first and second longitudinally extending stripping plates mounted on a frame and having opposed stripping edges which define a gap between them, the opposed stripping edges extending in a longitudinal direction; and a gap adjusting mechanism comprising:

an adjusting arrangement for moving the first and second stripping plates in opposite directions transverse to the longitudinal direction and toward or away from one another to adjust a size of the gap; and a rocker assembly comprising:

a first pivot shaft extending in the longitudinal direction, the first pivot shaft comprising a first end connected to the first stripping plate at a first location and a second end connected to the first stripping plate at a second location;

a first bearing pivotally mounting the first pivot shaft to the frame;

a second pivot shaft extending in the longitudinal direction, the second pivot shaft comprising a first end connected to the second stripping plate at a third location and a second end connected to the second stripping plate at a fourth location;

a second bearing pivotally mounting the second pivot shaft to the frame; and an adjustable connection that adjusts the size of the gap independently of the adjusting arrangement and independently of respective pivot positions of the first and second pivot shafts.

16. The row unit of claim 15, wherein the first and second ends of the first pivot shaft are connected to the first stripping plate in a spaced relation, and wherein the first and second ends of the second pivot shaft are connected to the second stripping plate in a spaced relation.

17. The row unit of claim 15, wherein the rocker assembly comprises an adjustable ball joint connecting each of the first and second pivot shafts to the first and second stripping plates respectively.

18. The row unit of claim 17, further comprising a second adjustable connection, wherein each adjustable ball joint includes an one of the adjustable connections.

19. A method of positioning a row unit deck plate relative to a row unit frame comprising the steps of:

connecting an adjusting arrangement to the row unit frame and the deck plate for moving the deck plate;

connecting a rocker assembly to the row unit frame and the deck plate for establishing a position of the deck plate independently of the adjusting arrangement, the rocker assembly comprises a pivot shaft extending adjacent to the deck plate, the pivot shaft comprising an adjustable ball joint, the step of connecting the rocker assembly to the row unit frame and the deck plate comprising pivotably connecting the pivot shaft to the deck plate;

adjusting the adjusting arrangement to adjust the position of the deck plate; and adjusting the rocker assembly independently of the adjusting arrangement to adjust the position of the deck plate.

20. The method of claim 19, further comprising the step of threadedly connecting the ball joint to the deck plate.

* * * * *